United States Patent
Smith

[11] 3,908,900
[45] Sept. 30, 1975

[54] RECIRCULATING AUTOMOTIVE HEATING SYSTEM

[76] Inventor: James R. Smith, 2104 S. Long Lake Rd., Fenton, Mich. 48430

[22] Filed: Apr. 29, 1974

[21] Appl. No.: 464,920

[52] U.S. Cl. ............... 237/12.3 A; 98/2.05; 98/33 A
[51] Int. Cl.² ............................................ B60H 1/02
[58] Field of Search ........... 98/2.05, 2.06, 33 A, 10; 237/12.3 A, 12.3 B; 165/16

[56] References Cited
UNITED STATES PATENTS

| | | | |
|---|---|---|---|
| 2,093,936 | 9/1937 | Spielmann | 98/33 A |
| 2,224,407 | 12/1940 | Passur | 98/33 A |
| 2,364,220 | 12/1944 | Johnson | 98/33 A X |
| 3,202,075 | 8/1965 | Eriksson | 98/2.05 |
| 3,270,656 | 9/1966 | Cook | 98/116 X |
| 3,820,278 | 6/1974 | Giasante | 165/16 X |

Primary Examiner—William E. Wayner
Assistant Examiner—W. E. Tapolcai, Jr.
Attorney, Agent, or Firm—McGlynn and Milton

[57] ABSTRACT

An air recirculating assembly adapted for use in combination with a vehicle including an enclosable passenger compartment, an air-cooled engine having an engine cooling blower, and a heating system including at least one heat exchanger in heat exchange relationship with the engine for heating ambient air, a supply duct for conducting ambient air to the heat exchanger from the outlet side of the engine cooling blower, and an air distribution network for conducting heated air from the heat exchanger to the passenger compartment; the assembly comprising a recirculating blower having an inlet and outlet, the inlet being adapted for communication with the passenger compartment of the vehicle, and a return air duct adapted for connection between the outlet of the recirculating blower and the supply duct on the outlet side of the engine cooling blower for conducting air from the passenger compartment to the heat exchanger.

20 Claims, 3 Drawing Figures

RECIRCULATING AUTOMOTIVE HEATING SYSTEM

This invention is related to a recirculating heating system for a vehicle and is particularly adapted for use in a vehicle having an air-cooled engine.

As is commonly known, air-cooled engines are provided with an engine cooling fan or blower, the primary function of which is to cool the engine by forcing a current of ambient air, drawn from the atmosphere, over the cylinder heads and other portions of the engine to be cooled. The air heating system of many vehicles having air-cooled engines includes air supply ducts for conducting a portion of the ambient air driven by the engine cooling blower to one or more heat exchangers which are in heat exchange relationship with the engine to heat the ambient air. The heated air is then conducted from the heat exchanger through a heated air distribution network for distributing heated air to various portions of the passenger compartment of the vehicle. In short, the air heating system of the vehicle operates in the following manner: the engine cooling blower or fan draws ambient air from the atmosphere and forces it through air supply ducts to the heat exchangers, which heat the air, and then to the interior of the passenger compartment through a heated air distribution network.

One of the most serious problems encountered with an air heating system which employs the engine cooling blower as the only source of forced air flow in the heating system is that the speed of the blower is dependent upon the speed of the engine. Therefore, the output of the blower, that is, the volume of air flow available for heating, is greatly diminished when the engine is operating at a low speed. This problem is most apparent during the colder months of the year when it is desirable that the air heating system heat the interior of the passenger compartment and defrost or defog the windows as quickly as possible. The ability of the air heating system to accomplish these results is hindered because, while the engine is idling after starting, a relatively small air flow is generated by the engine cooling blower. Increasing the speed of the blower by revving up the engine is counterproductive since this merely increases the quantity of cold ambient air drawn into the system. Consequently, the engine remains relatively cold and ineffective to heat the air in the heating system for a longer period of time while an increased flow of unheated air is being conducted to the interior of the passenger compartment. The end result, therefore, is that it takes an inordinate amount of time for the interior of the passenger compartment to reach a comfortable temperature and for the windows to defrost or defog. Even after reasonable conditions have been obtained, the heating system is oftentimes incapable of maintaining such conditions if the vehicle is driven at low speeds, such as in city traffic. This is caused by the reduced output of the blower due to the low speed of the engine. In other words, the amount of air conducted through the heat exchangers is insufficient to maintain the interior of the passenger compartment at a comfortable temperature.

At least one make of automobile with an air-cooled engine is noted for being extremely airtight. While this property may be beneficial for some purposes, it increases the problems encountered with the air heating system. Since the passenger compartment of the vehicle is airtight, the engine cooling blower forcing air through the air heating system causes the pressure within the passenger compartment to build up. Not only is this back pressure uncomfortable for occupants of the vehicle, but it also reduces air flow and diminishes air circulation within the vehicle. One of the results of improper or poor circulation is that "hot spots" are produced in the regions immediately adjacent the hot air vents, thereby causing discomfort to the vehicle occupants. These undesirable conditions are normally experienced when the vehicle is traveling at higher speeds, such as on a highway or expressway, since the speed of the engine and, therefore, the output of the blower is great.

It is apparent from the above that, although the engine cooling blower affords a natural and convenient source of forced air for supplying the air heating system of the vehicle, there are certain inconveniences encountered which detract from the desirability of such a system. One of the purposes of the instant invention is to solve the problems encountered with air heating systems in vehicles having air-cooled engines by incorporating an air recirculating assembly in the existing air heating system of the vehicle.

In general, recirculating heating systems for vehicles have been suggested heretofore. However, such systems are incapable of solving the problems which are peculiar to air heating systems of vehicles having air-cooled engines. For example, the following U.S. Pat. Nos. disclose various reheating systems for vehicles: 2,302,416 issued Nov. 17, 1942; 2,612,829 issued Oct. 7, 1952; 2,876,998 issued Mar. 10, 1959; 2,984,415 issued May 16, 1961 and 3,451,469 issued June 24, 1969. In all of these systems, a single heater blower is provided which operates independently of the vehicle's engine. In other words, the sole function of the blower in these heating systems is to force air through a heating unit of some type and then to the passenger compartment of the vehicle. It would be a simple matter to provide air recirculation through the system by providing suitable communication between the intake side of the heater blower and the passenger compartment. When appropriate valves are provided, the heater blower is then capable of drawing either ambient air from the atmosphere, drawing air from the passenger compartment or both, so that recirculation occurs. In fact, this is precisely what is done in the heating systems disclosed in most of these patents.

It is important to note, however, that the heater blower is not employed to cool the engine and is operated independently thereof. Merely providing communication between the intake side of the engine cooling blower of an air-cooled engine would not give the same results. First of all, air flow through the heating system would still be dependent upon the speed of the engine. Along these same lines, the heating system is totally inoperative whenever the engine is shut off. It is well known that the heating systems of most U.S. automobiles having water-cooled engines include its own blower and that such blower can be operated even when the engine is not running. Furthermore, since the primary purpose of the engine cooling blower is to cool the engine, it would be undesirable to introduce heated air into the engine cooling blower when the outside ambient air is much more effective in cooling the engine.

Accordingly, it is a purpose of this invention to provide an air recirculating assembly adapted for use in combination with a vehicle including an air-cooled engine having an engine cooling blower, and a heating system including at least one heat exchanger in heat exchange relationship with the engine for heating ambient air, a supply duct for conducting ambient air to the heat exchanger from the outlet side of the engine cooling blower, and an air distribution network for conducting heated air from the heat exchanger to the passenger compartment. The air recirculating assembly of the instant invention includes a recirculating blower having an inlet side and an outlet side, the inlet side being adapted for communication with the passenger compartment of the vehicle and a return air duct adapted for connection between the outlet side of the recirculating blower and the supply duct on the outlet side of the engine cooling blower for conducting air from the passenger compartment to the heat exchanger. In this manner, air from the interior of the passenger compartment can be recirculated through the heating system whenever desirable by a recirculating blower which operates independently of the engine cooling blower or primary blower of the heating system.

Other purposes and functions of the instant invention will be readily appreciated as the same becomes better understood by reference to the following detailed description when considered in connection with the accompanying drawings wherein.

Figure 1:
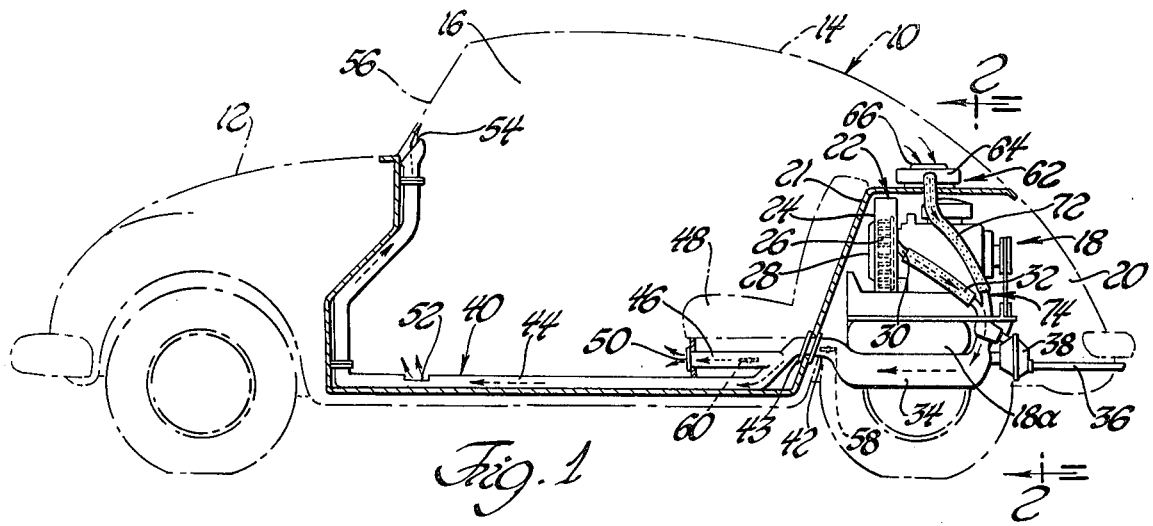
FIG. 1 is a side elevational view of a recirculating heating system constructed in accordance with the instant invention.

Referring to the drawings, a vehicle is generally shown at 10. The vehicle 10 is representative of the many vehicles which include air-cooled engines. Specifically, however, the vehicle 10 represents the Volkswagen "Beetle" and substantially includes the elements commonly associated therewith.

The vehicle 10 includes a body 12 which defines an enclosable passenger compartment 14 having an interior 16. The vehicle 10 also includes an air-cooled engine, generally shown at 18, which is disposed in an engine compartment 20 in the rear of the body 12. The engine compartment 20 is separated from the interior 16 of the passenger compartment 14 by means of a fire wall 21 of suitable construction. The air-cooled engine 18 is of standard construction and includes all of the elements normally associated with an air-cooled engine. For purposes of illustration, various parts of the engine 18 are shown such as the valve covers 18a, air cleaner 18b, distributor 18c, fan pulleys 18d, and fan belt 18e.

The air-cooled engine 18 further includes an engine cooling blower generally indicated at 22. The engine cooling blower 22 includes a fan shroud 24 and a fan 26 enclosed therein. The fan 26 is driven by the crank shaft (not shown) through the fan pulleys 18d and fan belt 18e and draws ambient air through an inlet opening 28 of the fan shroud 24. The outlet side of the blower 22 is in communication with the portions of the engine to be cooled. Additionally, the downstream side of the engine cooling blower 22 is provided with two outlet pipes 30 disposed on each side of the shroud 24. The outlet pipes 30 on the outlet side of the engine cooling blower 22 are connected to supply duct means comprising a pair of heater hoses or supply ducts 32. The supply ducts 32 conduct ambient air from the outlet side of the engine cooling blower 22 to heat exchange means comprising a pair of heat exchangers 34 which are in heat exchange relationship with the engine 18.

In the air-cooled engine 18 of the Volkswagen "Beetle," two heat exchangers 34 are provided, one supported along each side of the engine immediately below the valve covers 18a. The heat exchangers 34 are constructed such that hot exhaust gases from the engine are conducted in a heat exchange conduit through the heat exchangers 34. In other words, each of the heat exchangers 34 includes an outer shell through which an exhaust-carrying pipe 35 extends. The exhaust-carrying pipe 35 communicates with the exhaust ports of the cylinders and carries hot exhaust gases through the heat exchangers 34. The exhaust gases ultimately exit through an exhaust pipe 36 after passing through a muffler 38. Ambient air is forced by the blower 22 through the supply ducts 32 which communicate with the interior of the outer shells 33 of the heat exchangers 34 as at 37. The ambient air then flows around the exhaust gas conduit within the heat exchangers 34 and is thereby heated. Before entering the heat exchangers 34, the supply ducts 32 pass through a box 39 through which hot exhaust gases also travel enroute to the muffler 38. The interior of the boxes 39 are in communication with the muffler 38 by means of short pipes 41. The boxes 39, of course, aid in heating the ambient air in the system.

The vehicle 10 further includes heated air distribution means, generally indicated at 40, connected to the heat exchangers 34 for conducting heated air to the interior 16 of the passenger compartment 14 of the vehicle. FIG. 1 shows the specific details of the heated air distribution means 40 which extends along the left-hand or driver's side of the vehicle from one of the heat exchangers 34. The opposite side or right side of the vehicle includes a similar arrangement for conducting heated air from the other heat exchanger 34. The heated air distribution means 40 includes an inlet end 42 which is connected to the outlet side of the heat exchanger 34. The inlet end 42 passes through the fire wall 21 as at 43 and diverges into a first branch 44 which conducts air to the forward portion of the passenger compartment 14 and a second branch 46 which conducts air to the rear portion of the passenger compartment 14. Specifically, the second branch 46 extends beneath the rear passenger seat 48 and includes an outlet vent 50. The first branch 44 includes a floor outlet vent 52 for directing heated air along the lower portion of the passenger compartment 14 near the front thereof and a windshield outlet vent 54 for directing heated air toward the windshield 56 to defrost the same.

Cable-operated valves are disposed at various points in the heated air distribution means 40 for controlling the flow of heated air therein. Specifically, a primary valve 58 is disposed in the inlet end 42 of the heated air distribution means 40 for opening or closing the system. In other words, when the valve 58 is opened through a suitable cable control, heated air is able to flow through the heated air distribution means 40. Conversely, when the valve 58 is in the closed position, heated air will not flow through the heated air distribution means 40. Another cable-operated valve 60 is disposed in the second branch 46 of the heated air distribution means 40. The valve 60 is operably connected to suitable cable controls such that air flow to the rear of the passenger compartment 14 through branch 46 may be shut off. When valve 60 is closed, all of the air entering through inlet portion 42 is conducted to the forward portion of the passenger compartment 14 through the first branch 44.

The elements thus far described are those which in the same or in a similar form are provided in many vehicles having air-cooled engines and particularly are included in the Volkswagen "Beetle." In other words, the air heating system of such a vehicle generally consists of heat exchanger means 34 for heating ambient air, an engine cooling blower or primary blower means 22 having an inlet side 28 and an outlet side 30, supply duct means 32 for conducting ambient air from the outlet side 30 of the blower 22 to the heat exchanger means 34, and heated air distribution means 40 connected to the heat exchanger means 34 for conducting heated air to the interior 16 of the passenger compartment 14 of the vehicle 10. Such a heating system is subject to the problems and deficiencies described above.

Figure 2:
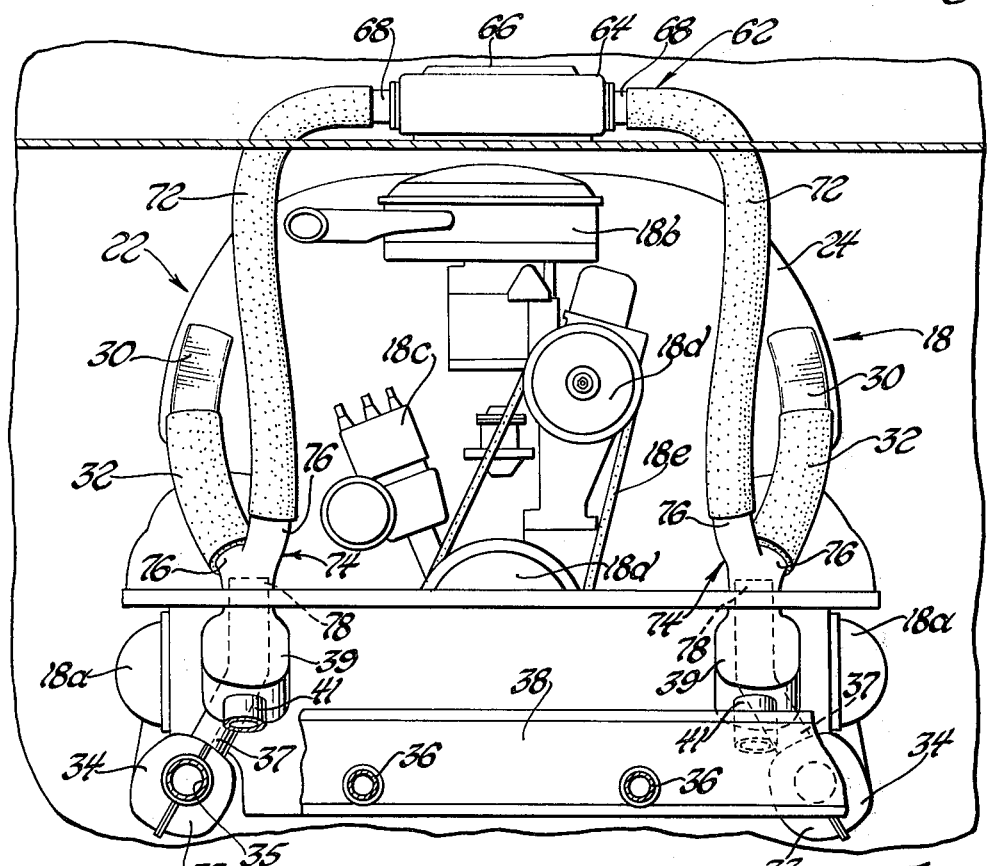
FIG. 2 is a view taken generally along line 2—2 of FIG. 1.
Figure 3:
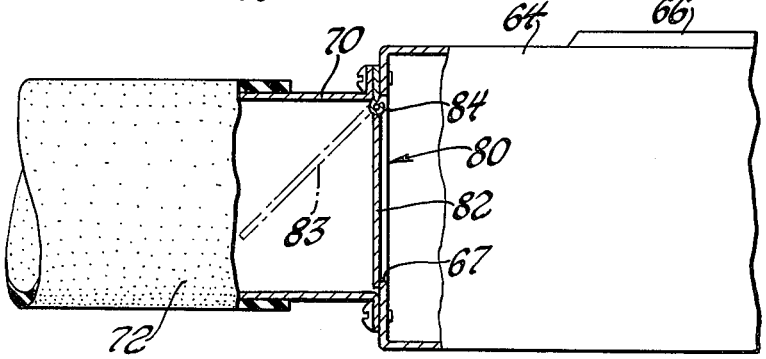
FIG. 3 is an enlarged broken-away view, partly in cross section, of an element of the instant invention.

The recirculating heating system of the instant invention includes air recirculating means generally shown at 62. The air recirculating means 62 includes secondary blower means 64 which may also be characterized as recirculating blower means. The blower means 64 comprises any type of blower which may be conveniently added to the system and is not restricted to any particular design except as discussed in greater detail below. The secondary or recirculating blower 64 includes inlet means 66 comprising an aperture on the inlet or suction side of the blower 64 communicating with the interior 16 of the passenger compartment 14, and outlet means 68 comprising one or more apertures 67 on the outlet or downstream side of the blower means 64. In the blower 64 employed, outlet pipes 70 are fastened to the housing of the blower 64 over each of two outlet apertures 67, shown particularly in FIG. 3. As shown in FIGS. 1 and 2, the blower 64 is mounted toward the rear of the passenger compartment and, specifically, on a shaft behind the rear passenger seat 48.

The air recirculating means 62 further includes return air duct means 72 connected to the outlet pipes 70 of the outlet means 68 of the blower 64 for conducting air to the heat exchange means 34. The return air conducting means 72, comprising a pair of return air hoses which pass through suitable openings cut in the fire wall 21, intersect the supply ducts 32 on the outlet side 30 of the primary blower means 22. For this purpose, the return air duct means 72 includes connection means, generally indicated at 74, for intersectingly connecting the same to the supply ducts 32. The connection means 74 includes a connection member having two inlet branches 76 and one outlet branch 78. A suitable connection member 74 for use in the return air duct means 72 is a common Y-type connection.

The air recirculating means 62 further includes check valve means, generally shown at 80, for substantially preventing air flow through the air recirculating means 62 in a direction away from the supply duct means 32; that is, in a direction opposite to that established when the blower 64 is operating. The check valve means 80 includes a valve member 82 disposed over the outlet aperture 67 of the blower 64 so that, when the blower 64 is not operating, air traveling through the supply ducts 32 is prevented from passing through the return air ducts 72 and into the interior 16 of the passenger compartment 14 through the blower inlet 66. It is, of course, undesirable for air to travel in such reverse direction; that is, away from the supply ducts 32 and the heat exchangers 34, since unheated ambient air would be permitted to enter the passenger compartment 14 through the blower inlet 66. In the specific embodiment of the blower 64, two valve members 82 are provided since the outlet means 68 includes two outlet apertures 67. Each of the valve members 82 is hingedly attached, as at 84, to the top of the outlet pipe 70. Due to the hinged connection 84, the valve member 82 is urged by gravitational force and reverse air flow to the closed position over the outlet aperture 67. It is noted that the valve member 82 is larger in area than the aperture 67 so that it may swing only between the full line position, in which the aperture 67 is closed and toward the broken line position 83, in which the aperture 67 is open. In this way, the valve member 82 is openable in response to air flow in a first direction wherein the first direction is toward the supply duct 32 and closable in response to air flow in a second direction and to a condition of no air flow.

When the blower 64 is operating, the air flow thus created swings the valve members 82 open so that air pulled from the interior 16 of the passenger compartment 14 by the blower 64 is permitted to return to the supply ducts 32 through the return air hoses 72. However, air flow in the opposite direction, that is, to the right as viewed in FIG. 3, urges the valve members 82 to the closed position. This situation arises when the primary blower 22 is operating but the secondary blower 64 is not. Additionally, the valve member 82 closes when neither the primary blower 22 nor the secondary blower 64 are operating due to natural gravitational forces. In this way, air can only travel in a single desired direction through the recirculating portion of the air heating system.

Although the check valve means 80 in the embodiment shown includes a valve member 82 which is hingedly supported adjacent the outlet opening 67, it is apparent that there are many other types of check valve arrangements which may be employed and which will give comparable results. The only requirement is that the check valve be employed at some point between the inlet 66 of the secondary blower 64 and the supply duct 32 to prevent reverse air flow through the blower 64 into the passenger compartment 14.

As alluded to above, the recirculating or secondary blower 64 may be of any type commonly available on the market. The only requirement is that the blower be powerful enough to overcome any reverse flow caused by the primary blower 22 when both are operating. It has been found that a blower which operates between 3000 and 3500 R.P.M. is sufficiently powerful to meet this requirement. The blower 64 employed in the specific embodiment of the instant invention is preferably driven by an electric motor which draws power from the standard electrical circuit of the vehicle 10. Electrical lines for connection with the electrical circuit of the vehicle 10 preferably include a switch of some type so that the recirculating or secondary blower 64 may be turned on or off. This switch can be conveniently located near the forward portion of the passenger compartment 14 so as to be operable by the driver of the vehicle. It is apparent, however, that other types of blowers may be employed which are equivalent and give substantially the same results and that the electrically powered blower, described immediately above, is merely a preferred example.

In operation, when the engine is running at low speed, the recirculating or secondary blower 64 may be turned on to draw air from the interior 16 of the passenger compartment 14 and recirculate the air through the heat exchangers 34. A number of beneficial results are thus obtained. First of all, the amount of air flowing through the heat exchangers 34 is greatly increased since the air flow is no longer dependent solely on the speed of the primary blower 22. Secondly, heat which the air in the interior 16 of the passenger compartment 14 has already acquired from the heat exchangers 34 is not wasted since this somewhat heated air is recirculated through the heat exchangers 34 to acquire additional heat. Thirdly, there is no back pressure developed within the passenger compartment 14 since the heated air entering through the outlets 50, 52, and 54 is permitted to exit through the blower 64; in other words, no dead end is created. Fourthly, since circulation throughout the interior 16 of the passenger compartment 14 is tremendously improved under any speed conditions, the windows, and particularly the windshield 56, are quickly defrosted and "hot spots" are avoided.

Once the engine 18 has reached a suitable temperature and is operating at a speed sufficient to maintain the interior 16 of the passenger compartment 14 at a comfortable temperature, the recirculating or secondary blower 64 may be turned off. Under these conditions, the check valve means 80 prevents air from traveling from the primary blower 22 to the secondary blower 66 through the return air hoses 72. When the engine is turned off, it is possible to continue heating the interior 16 of the passenger compartment by turning on the recirculating or secondary blower 64. In this manner, air flow through the heat exchangers 34 is continued and the passenger compartment 14 may be heated until the engine cools off. In this way, when the vehicle 10 is parked, it is unnecessary to keep the engine idling in order to keep the passenger compartment warm, at least for the period of time before the engine becomes cold.

Another advantage of the instant invention is obtained when maintenance work is required on the engine. Many aircooled engines, and particularly the engine used in the Volkswagen "Beetle" require periodic engine work and, particularly, adjustment of the valves. Heretofore, it has been necessary to let the vehicle stand for a period of time, approximately 1½ hours, to permit the engine to cool to a temperature at which maintenance can be safely carried out. The cooling off time for the vehicle is, of course, wasted. When the engine 18 of the vehicle 10 is turned off, the primary valve 58 of the heated air distribution means 40 is closed and the recirculating or secondary blower 64 is turned on. Since the air is prevented from passing into the passenger compartment 14, it circulates through the cooling portions of the engine 18, thereby cooling off the engine and particularly the cylinder heads to permit maintenance work after a much reduced cooling period.

It is contemplated that the blower 64 and return air ducts 72 may be added to the existing air heating system of vehicles having air-cooled engines either during initial construction of the vehicle by the manufacturer or after such construction is complete by the dealer or vehicle owner. The vehicle may be altered in accordance with the instant invention by mounting the blower 64 and wiring into the electrical system, cutting holes in the fire wall 21 for the return air ducts 72, and splicing the return air ducts 72 into the supply ducts 32 downstream of the engine cooling blower 22.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property of privilege is claimed are defined as follows:

1. A recirculating heating system for a vehicle having an enclosable passenger compartment comprising: heat exchange means for heating ambient air, primary blower means having an inlet side and an outlet side supply duct means for conducting ambient air from the outlet side of said primary blower means to said heat exchange means, air distribution means connected to said heat exchange means for conducting heated air to the interior of the passenger compartment of the vehicle, and air recirculating means including secondary blower means having inlet means and outlet means said inlet means communicating with the interior of the passenger compartment, and return air duct means connected to said outlet means of said secondary blower means for conducting air to said heat exchange means, said return air conducting means communicating with said supply duct means on the outlet side of said primary blower means.

2. A system as set forth in claim 1 wherein said air recirculating means includes check valve means for substantially preventing air flow through said air recirculating means in a direction away from said supply duct means.

3. A system as set forth in claim 2 wherein said check valve means includes a valve member openable in response to air flow in a first direction and closable in response to air flow in a second direction and to a condition of no air flow, said first direction being toward said supply duct means.

4. A system as set forth in claim 3 wherein said return air duct means includes connection means for intersectingly connecting the same to said supply duct means.

5. A system as set forth in claim 4 wherein said connection means includes a connection member having two inlet branches and one outlet branch.

6. A system as set forth in claim 5 wherein said outlet means of said secondary blower means includes two outlet members.

7. A system as set forth in claim 6 wherien said return air duct means includes two return air hose members one of said hose members being connected to each of said outlet members of said secondary blower means 8. A system as set forth in claim 7 wherein said primary blower means includes a fan and a fan shroud having two outlet pipes.

9. A system as set forth in claim 8 wherein said heat exchange means includes a pair of heat exchangers in heat exchange relationship with a heated portion of the engine.

10. A system as set forth in claim 9 wherein said supply duct means includes a pair of heater hose members connected between said two outlet pipes of said fan shroud and said two heat exchangers.

11. A system as set forth in claim 7 wherein said heated air distribution means includes valve means for controlling the flow of air of various parts of the passenger compartment and for selectively preventing air flow.

12. An air recirculating assembly adapted for use in combination with a vehicle including an enclosable passenger compartment, an air-cooled engine having an engine cooling blower, and a heating system including at least one heat exchanger in heat exchange relationship with the engine for heating ambient air, a supply duct for conducting ambient air to the heat exchanger from the outlet side of the engine cooling blower, and an air distribution network for conducting heated air from the heat exchanger to the passenger compartment; said assembly comprising recirculating blower means having inlet means and outlet means, said inlet means being adapted for communication with the passenger compartment of the vehicle, and return air duct means adapted for connection between said outlet means of said recirculating blower means and the supply duct on the outlet side of the engine cooling blower for conducting air from the passenger compartment to the heat exchanger.

13. An assembly as set forth in claim 12 wherein said assembly includes check valve means for substantially preventing air flow through said return air duct means in a direction away from the supply duct means.

14. An assembly as set forth in claim 13 wherein said check valve means includes a valve member openable in response to air flow in a first direction and closable in response to air flow in a second direction and to a condition of no air flow, said first direction being toward the supply duct means.

15. An assembly as set forth in claim 14 wherein said return air duct means includes at least one return air hose member.

16. An assembly as set forth in claim 15 wherein said return air duct means includes connection means for intersectingly connecting said return air hose member to the supply duct.

17. An assembly as set forth in claim 16 wherein said connection means includes a connection member having two inlet branches and one outlet branch.

18. An assembly as set forth in claim 17 wherein said outlet means of said recirculating blower means includes two outlet members and said return air duct means includes two return air hose members.

19. An assembly as set forth in claim 18 wherein one of said connection members is provided for each of said return air hose members.

20. An assembly as set forth in claim 19 wherein said check valve means includes two valve members, one of which is hingedly attached to each of said outlet members of said recirculating blower means.

* * * * *